United States Patent
Germscheid

(10) Patent No.: US 11,815,375 B2
(45) Date of Patent: Nov. 14, 2023

(54) METER TUBE ASSEMBLY

(71) Applicant: Micro-Trak Systems, Inc., Eagle Lake, MN (US)

(72) Inventor: Jeff Germscheid, Eagle Lake, MN (US)

(73) Assignee: Micro-Trak Systems, Inc., Eagle Lake, MN (US)

( * ) Notice: Subject to any disclaimer, the term of this patent is extended or adjusted under 35 U.S.C. 154(b) by 0 days.

(21) Appl. No.: 17/004,423

(22) Filed: Aug. 27, 2020

(65) Prior Publication Data

US 2021/0063215 A1 Mar. 4, 2021

Related U.S. Application Data

(60) Provisional application No. 62/893,940, filed on Aug. 30, 2019.

(51) Int. Cl.
  *G01F 1/32* (2022.01)
  *F16K 47/04* (2006.01)
  *G05D 7/01* (2006.01)
  *G01F 1/40* (2006.01)

(52) U.S. Cl.
  CPC ............ *G01F 1/3236* (2013.01); *F16K 47/04* (2013.01); *G01F 1/40* (2013.01); *G05D 7/0186* (2013.01)

(58) Field of Classification Search
  CPC ... B01F 15/0203; G05D 7/0186; F16K 47/00; F16K 47/4704; F16K 47/06; G01F 1/42
  See application file for complete search history.

(56) References Cited

U.S. PATENT DOCUMENTS

| | | | |
|---|---|---|---|
| 2,021,079 A * | 11/1935 | Mittendorf | F25B 41/37 138/42 |
| 2,037,994 A | 4/1936 | Neubauer | |
| 3,856,049 A * | 12/1974 | Scull | F16L 55/02781 138/42 |
| 5,520,333 A | 5/1996 | Tofte | |
| 2005/0252559 A1 | 11/2005 | McCarty et al. | |
| 2011/0199855 A1 | 8/2011 | Hanada | |
| 2018/0355704 A1 | 12/2018 | Typhonix et al. | |

FOREIGN PATENT DOCUMENTS

| | | |
|---|---|---|
| KR | 100807621 | 2/2008 |
| WO | 2019018117 | 1/2019 |

OTHER PUBLICATIONS

Kim et al., KR 10-0807621 B1, Feb. 2008, KIPO Machine Translation (Year: 2008).*
International Search Report and Written Opinion corresponding to PCT/US2020/048222, dated Nov. 26, 2020.

* cited by examiner

*Primary Examiner* — Erika J. Villaluna
(74) *Attorney, Agent, or Firm* — Merchant & Gould P.C.

(57) ABSTRACT

A metering tube assembly for regulating flow of a fluid is disclosed. The metering tube assembly can include a fluid inlet, a fluid outlet, and a plurality of stacked metering plates located between the fluid inlet and the fluid outlet, each of the plurality of stacked metering plates defining a fluid passageway having a length greater than a thickness of the metering plate, wherein the stacked metering plates are arranged such that a fluid flowing through the metering plates flows sequentially through the fluid passageways of the metering plates.

11 Claims, 6 Drawing Sheets

METER TUBE ASSEMBLY

CROSS-REFERENCE TO RELATED APPLICATION

This application claims the benefit of U.S. Provisional Application No. 62/893,940, filed Aug. 30, 2019, and titled "Meter Tube Assembly," the disclosure of which is hereby incorporated herein by reference.

BACKGROUND

Spraying systems exist for applying a material onto the ground or a field including crops or other vegetation. In many applications, a plurality of spray nozzles are fluidly connected to one or more manifolds which are in turn fluidly connected to one or more tanks. To ensure that the same amount of each material is provided from each of the tanks to the each nozzle, various regulating systems have been developed, such as balancing valves and individual control valves. However, improvements are desired.

SUMMARY

A metering tube assembly for regulating flow of a fluid is disclosed. The metering tube assembly can include a fluid inlet, a fluid outlet, and a plurality of stacked metering plates located between the fluid inlet and the fluid outlet, each of the plurality of stacked metering plates defining a fluid passageway having a length greater than a thickness of the metering plate, wherein the stacked metering plates are arranged such that a fluid flowing through the metering plates flows sequentially through the fluid passageways of the metering plates.

In some examples, the fluid passageway of each metering plate is formed as an open channel in the metering plate.

In some examples, each metering plate defines a first side and a second side, and wherein a first segment of the fluid passageway is defined on the first side and a second segment is defined on the second side.

In some examples, the fluid passageway includes a third segment extending through a thickness of the metering plate to join the first and second segments of the fluid passageway.

In some examples, at least a portion of the fluid passageway length is non-linear.

In some examples, at least a portion of the fluid passageway forms a spiral shape.

In some examples, the metering tube assembly further includes a plurality of gaskets between the plurality of stacked metering plates.

In some examples, each of the plurality of gaskets defines a central aperture placing the fluid passageways of adjacent metering plates in fluid communication with each other.

In some examples, each of the plurality of metering plates is identical to the others of the plurality of metering plates.

In some examples, the plurality of metering plates includes at least one metering plates.

In some examples, the fluid passageway extends between a first end and a second end, wherein the first and second ends are coaxially aligned about a longitudinal axis of the metering plate.

In some examples, the longitudinal axis of the metering plate extends through a center of the metering plate.

In some examples, the fluid inlet and the fluid outlet are coaxially aligned about the longitudinal axis.

A metering plate for a fluid-regulating metering tube assembly is disclosed. The metering plate can include a main body defining a first side and a second side defining a thickness of the main body and a fluid passageway extending from the first side of the main body to the second side of the main body, the fluid passageway having a length that is greater than the thickness of the main body, the fluid passageway extending between a first end and a second end, wherein the first and second ends are coaxially aligned about a longitudinal axis of the main body.

In some examples, the fluid passageway is formed as an open channel in the metering plate.

In some examples, a first segment of the fluid passageway is defined on the first side and a second segment is defined on the second side.

In some examples, the first segment and the second segment are parallel to each other.

In some examples, the fluid passageway includes a third segment extending through a thickness of the metering plate to join the first and second segments of the fluid passageway.

In some examples, at least a portion of the fluid passageway length is non-linear.

In some examples, at least a portion of the fluid passageway forms a spiral shape.

In some examples, at least a portion of the fluid passageway is orthogonal to the longitudinal axis.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
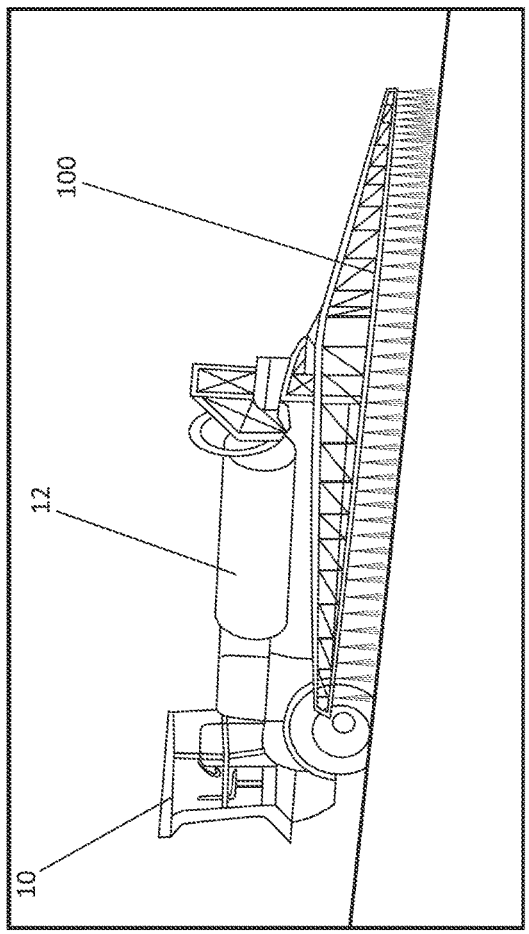
FIG. 1 is a schematic perspective view of a spraying system having features in accordance with the present disclosure, wherein the spraying system is mounted to a vehicle.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. Referring to the drawings wherein like reference numbers correspond to like or similar components throughout the several figures.

Figure 2:
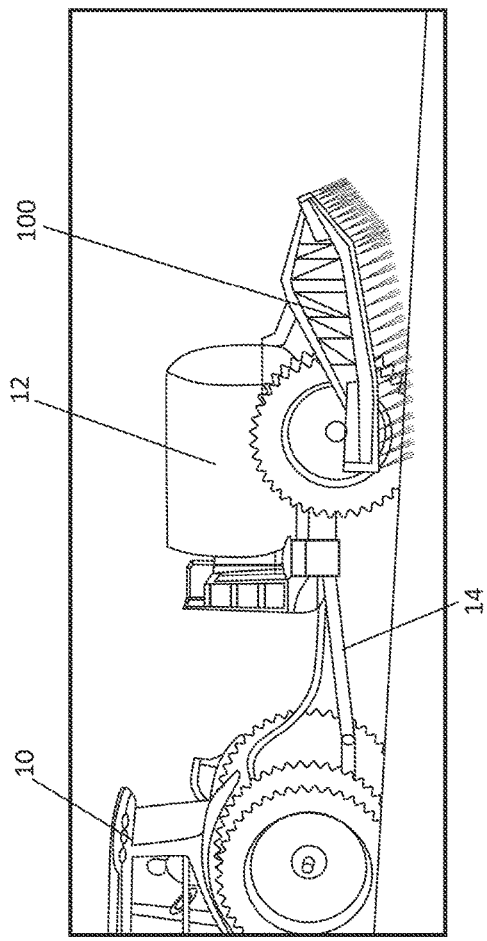
FIG. 2 is a schematic perspective view of a spraying system having features in accordance with the present disclosure, wherein the spraying system is mounted to a trailer towed by a vehicle.

Referring to FIGS. 1 and 2, a spraying system 100 in accordance with the present disclosure is shown. The spraying system 100 is configured for spraying a liquid material onto the ground or a field including crops or other vegetation. In FIG. 1, the spraying system 100 is shown as being mounted to the rear of a vehicle 10 supporting one or more tanks 12 in fluid communication with the spraying system 100. In FIG. 2, the spraying system 100 is shown as being mounted to the rear of a trailer 14 supporting one or more tanks 12, wherein the trailer 14 is towed by a vehicle 10, such as a tractor.

Figure 3:
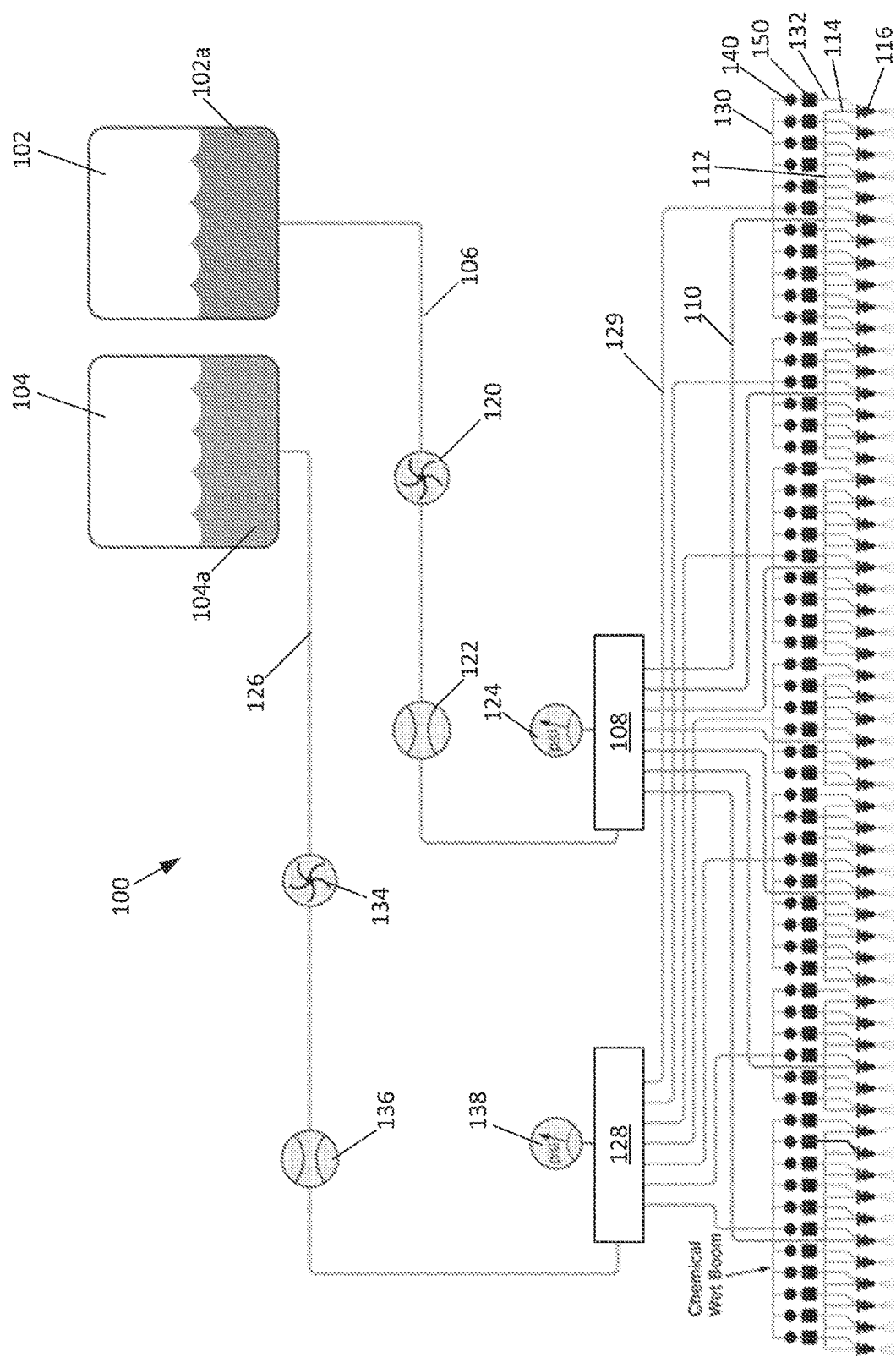
FIG. 3 is a schematic diagram of the spraying system of FIGS. 1 and 2.

Referring to FIG. 3, a schematic of the spraying system 100 is presented. In one aspect, the spraying system 100 draws, combines, and distributes fluid from a carrier fluid tank 102 and a chemical fluid tank 104. One example of a carrier fluid 102a stored in the carrier fluid tank 102 is water. Some examples of a chemical fluid 104a in the chemical fluid tank 104 are fertilizers, herbicides, and pesticides.

The spraying system 100 is further shown as including a branch line 106 extending between the carrier fluid tank 102 and a manifold 108 from which a plurality of branch lines 110 extend to manifolds 112 from which another plurality of branch lines 114 extend to individual spray nozzles 116. In the example shown, the nozzles 118 include control valves that can be operated between open and closed positions in an on/off type of control or in a modulating-type (e.g. PWM) control. In the branch line 106, a pump 120 is provided for pumping the carrier fluid 102a from the carrier fluid tank 102 to the nozzles 118. A flow meter 122 and carrier manifold pressure sensor 124 are also shown for providing inputs to a control system such that the pump 120 can be appropriately operated.

The spraying system 100 is further shown as including a branch line 126 extending between the chemical fluid tank 104 and a manifold 128 from which a plurality of branch lines 129 extend to manifolds 130 from which another plurality of branch lines 132 extend to the individual spray nozzles 116. In the branch line 126, a pump 134 is provided for pumping the chemical fluid 104a from the chemical fluid tank 104 to the nozzles 118. A flow meter 136 and carrier manifold pressure sensor 138 are also shown for providing inputs to a control system such that the pump 134 can be appropriately operated.

In one aspect, the branch lines 132 are also shown as being provided with control valves 140 that can be operated between open and closed positions in an on/off type of control or in a modulating-type (e.g. PWM) control. A metering tube assembly 150 is also shown as being provided in the branch lines 132 upstream of the control valve 140. The purpose of the metering tube assembly 150 is to help regulate the flow to each nozzle 118 such that, when the control valve 140 is in an open position, the appropriate amount of chemical fluid 104a in relation to the amount of carrier fluid 102a is delivered to each nozzle 118.

Referring to FIGS. 4 to 8, an example metering tube 150 is shown in further detail. As shown, the metering tube assembly 150 includes an inlet plate 152 defining an inlet port 152a, an outlet plate 154 defining an outlet port 154a, and a plurality of intermediate metering plates 156 separated by gaskets 158. In the example shown, each of the inlet plate 152, outlet plate 154, metering plates 156, and gaskets 158 are provided with apertures for receiving mechanical fasteners 160 such that the plates 152, 154, 156 and gaskets 158 can be secured together in a liquid-tight manner. In the example shown, the mechanical fasteners 160 are bolts. Other means for securing the components of the metering tube assembly 150 can also be utilized. In the example shown, three metering plates 156 are provided. However, more or fewer metering plates may be used depending upon the application.

As shown, each metering plate 156 defines a fluid passageway including a first fluid passageway segment 162 on a first side 156a of the metering plate 156, a second fluid passageway segment 164 on a second side 156b of the metering plate 156, and a third fluid passageway segment 166 extending from the first and second sides 156a, 156b of the metering plate 156 interconnecting the first and second fluid passageway segments 162, 164. In one aspect, the first and second sides 156a, 156b are separated by a thickness T1. In the example shown, the first and second fluid passageway segments 162, 164 are open channels extending between a first end 162a, 164a and a second end 162b, 164b. In the example shown, the first and second fluid passageway segments 162, 164 are formed as a spiral shape. Accordingly, at least some portions of the fluid passageways can be characterized as being curved or non-linear. In one aspect, the first and second fluid passageway segments 162, 165 are parallel to each other. Stated another way, the first fluid passageway segment 162 extends across a first plane and the second fluid passageway segment 164 lies along a second plane, wherein the first and second planes are parallel to each other. Other configurations and shapes are possible. For example, the fluid passageway could have a serpentine shape. For example, the fluid passageway could be an internal passageway within the metering plate 156 formed, for example, by machining or an additive manufacturing process.

As shown, each gasket 158 defines a first side 158a and a second side 158b with a central aperture 168 extending between the first and second sides 158a, 158b. The central aperture 168 is aligned with the first ends 162a, 164a of the first and second fluid passageway segments 162, 164.

Figure 4:
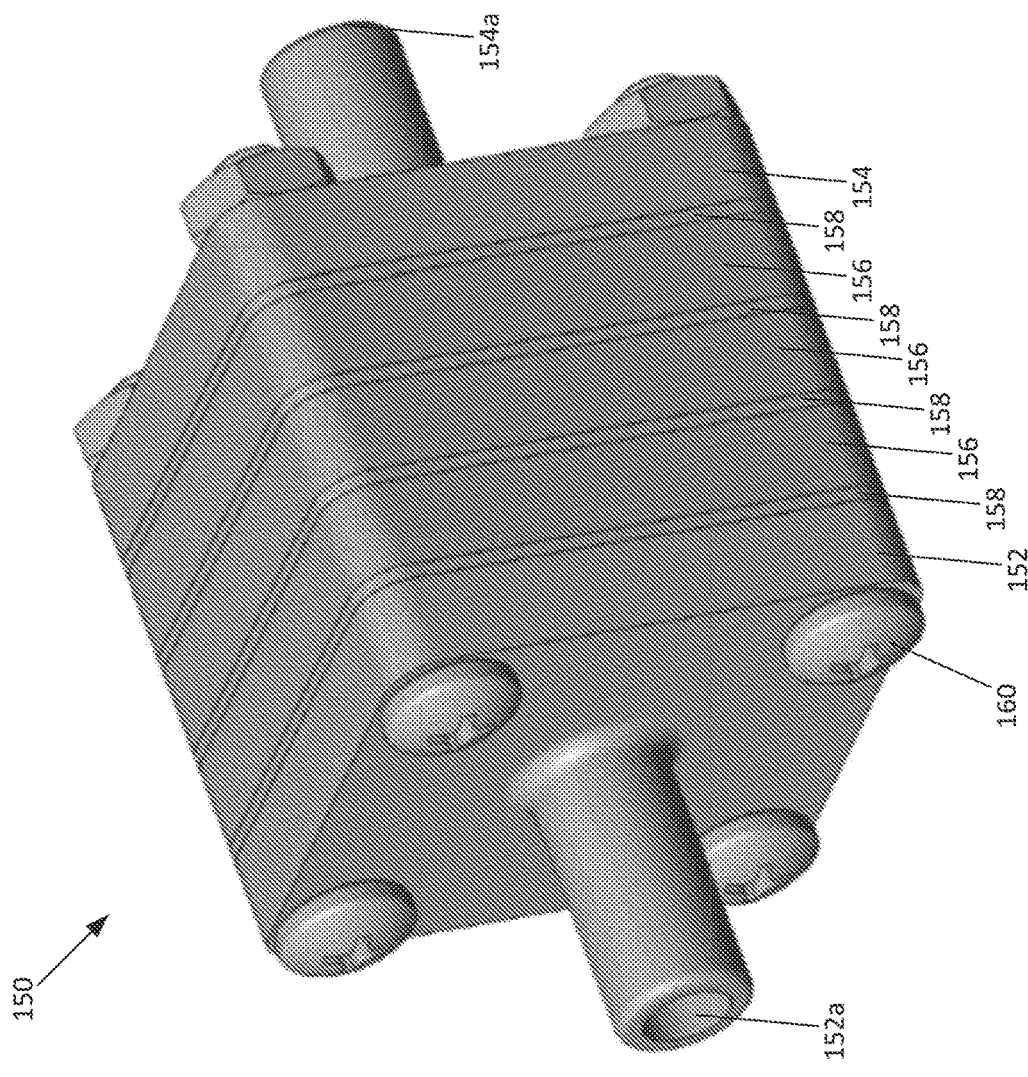
FIG. 4 is a perspective view of an individual metering tube assembly associated with the spraying system shown in FIG. 3.

In the example shown at FIG. 4, chemical fluid 104a enters the inlet port 152a of the inlet plate 152 and passes through the central aperture 168 of a first gasket 158 (G1) and into the first end 162a of the first fluid passageway segment 162 of the adjacent metering plate 156 (MP1). The chemical fluid 104a then flows to the second end 162b of the first fluid passageway segment 162, through the third fluid passageway segment 166, and into the second fluid passageway segment 164, flowing from the second end 164b to the first end 164a of the second fluid passageway segment 164. At this point, the chemical fluid 104a passes through the central aperture 168 of the adjacent gasket 158 (G2) and into first fluid passageway segment 162 of the adjacent metering plate 156 (MP2). The chemical fluid 104a then passes through the third and second fluid passageway segments 166, 164, as described above, and through the central aperture 168 of the next gasket 158 (G3). From this point, the chemical fluid 104a flows through the first, third, and second fluid passageway segments 162, 166, 164 of the next metering plate 156 (MP3) and through the central aperture 168 of the next gasket 158 (G4) at which point the chemical fluid 104a exits the metering tube assembly via the outlet port 154a of the outlet plate 154. In one aspect, the fluid flowing through the metering plates 156 can be characterized as flowing sequentially through the fluid passageways of the metering plates 156.

In one aspect, the metering tube assembly 150 has a longitudinal axis X extending through a center of the metering tube assembly 150 and each of the metering plates 156. As shown, the fluid inlet 152a and the fluid outlet 154a are coaxially aligned about the longitudinal axis X. As shown, the first end 162a of the first passageway segment 162 and the first end 164a of the second passageway segment 164 are also coaxially aligned about the longitudinal axis X. As shown, the central apertures 168 of the gaskets 158 are also coaxially aligned about the longitudinal axis X. With such an arrangement, each of the metering plates 158 and gaskets 158 can be stacked without regard to a specific orientation as long as the sides are generally aligned with each other. Additionally, differently configured metering plates 156 can also be stacked together as long as they have their fluid passageway inlets and outlets are aligned about the longitudinal axis X. In some examples, these features are aligned along a common axis that does not pass through the center of the plates 156

With such a configuration, the metering tube assembly 150 offers fluid flow resistance similar to the way an orifice plate does, with the distinct advantage of having a much larger internal diameter to achieve similar flow regulation. For example, where an orifice for a typical nozzle-based spray application would likely require an internal diameter of 0.008" and a thickness of 0.030" the equivalent metering tube assembly 150 would have an internal diameter D1 of 0.032" at the fluid passageway segments 162, 164, 166 and a thickness or total length of 144". Accordingly, the cross sectional area of the aforementioned meter tube assembly fluid passageway segments 162, 164, 166 is over 15 times greater than a 0.008 orifice making the metering tube assembly 150 advantageously less susceptible to plugging.

The metering tube assembly 150 design loosely follows Poiseuille's law that states the velocity of the steady flow of a fluid through a narrow tube varies directly as the pressure and the fourth power of the radius of the tube and inversely as the length of the tube and the coefficient of viscosity, see Poiseuille's Law below:

Poiseuille's Law for Laminar Flow of a Newtonian Fluid Through a Tube:

$$\frac{V}{t} = \Delta P \pi r^4 / 8 \eta L$$

V/t=Q=flow rate (in³/s)
ΔP=pressure difference (psi)
r=radius of tube=tube inner diameter/2 (in)
n=coefficient of viscosity for the fluid (e.g. for water at 20° C.: n=1.45×10⁻⁷ lb*s/in²)
L=length of tube (in)
[Flow rate increases with higher pressure or wider tubes and it decreases with higher viscosity or longer tubes.]

In view of the above, each metering plate 156 can have a specified fluid flow cross sectional area and length, as described above. In some examples, and in the example shown in the drawings, the metering plates 156 are identical to each other. In some examples, the metering plates 156 have differently sized or arranged fluid passageway segments 162, 164, 166. In some implementations several predetermined metering plate 156 designs are provided, each having a different fluid flow cross sectional area and length along with color coding for easy identification such that various metering plate 156 combinations can be created. Also, depending on the flow regulation needs, the metering tube assembly 150 can have more or fewer metering plates 156 and gaskets 158 than the three metering plates 156 and four gaskets 158 shown in the drawings.

Figure 5:
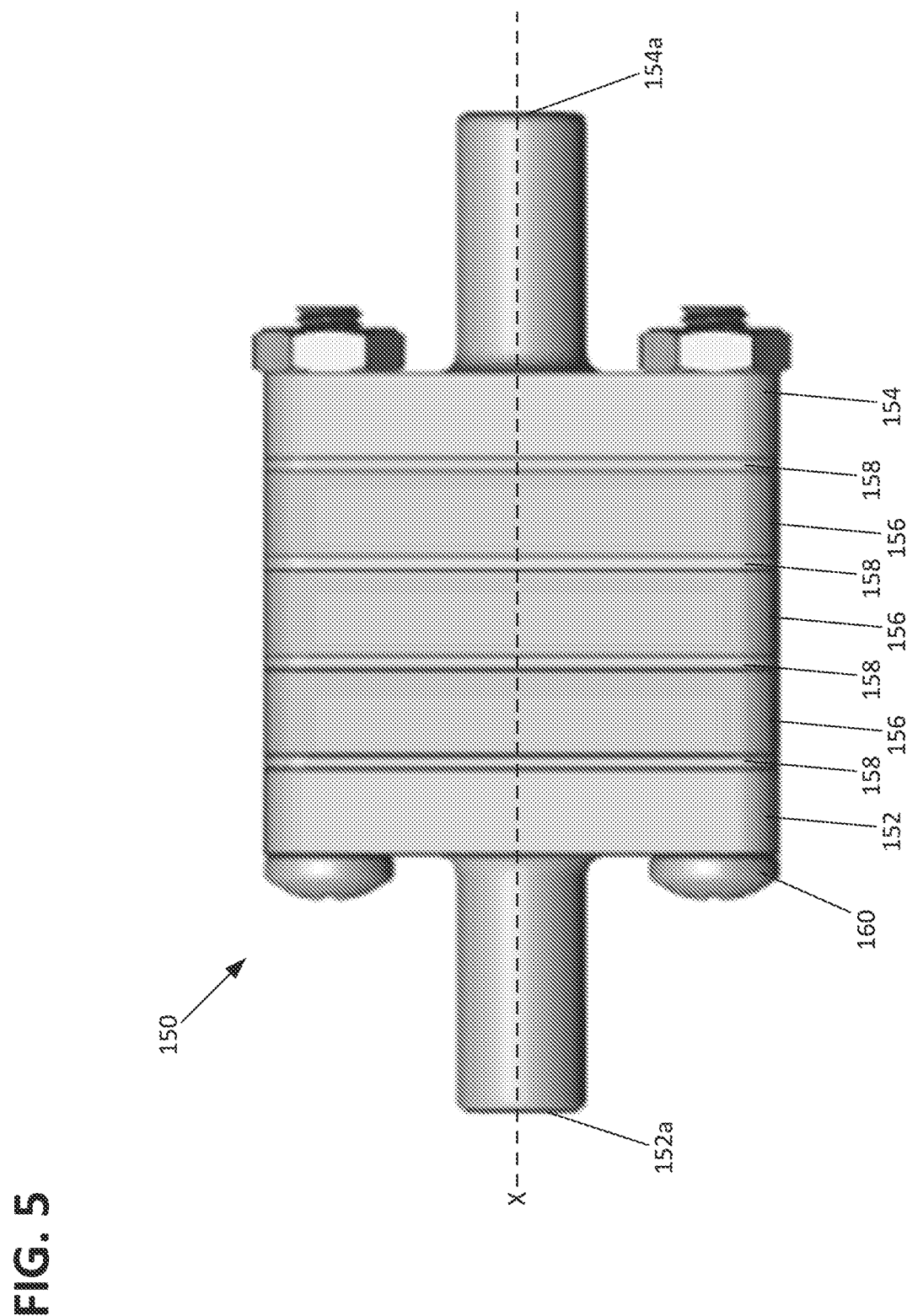
FIG. 5 is a side view of the metering tube assembly shown in FIG. 4.
Figure 6:
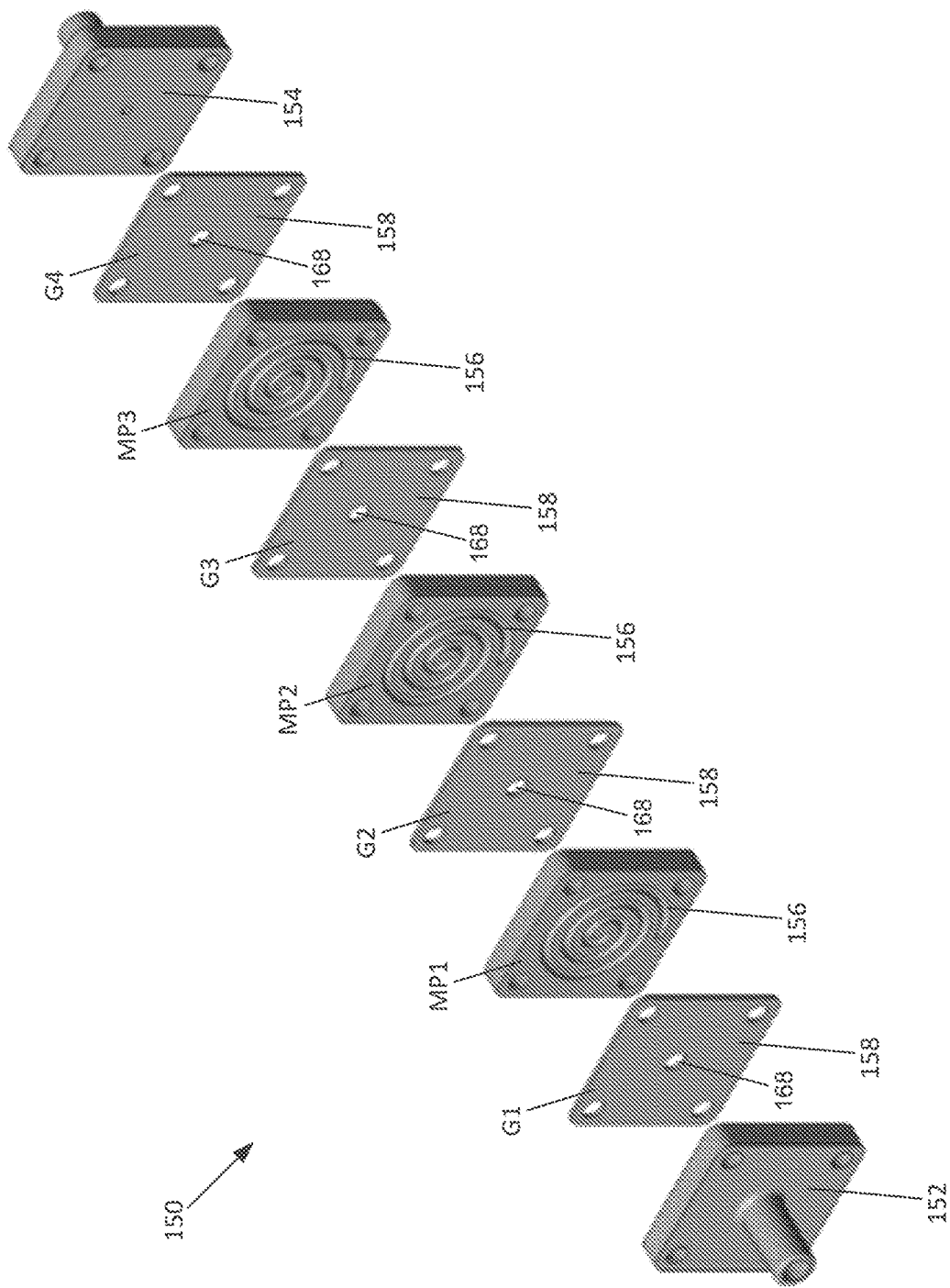
FIG. 6 is an exploded perspective view of the metering tube assembly shown in FIG. 4.
Figure 8:
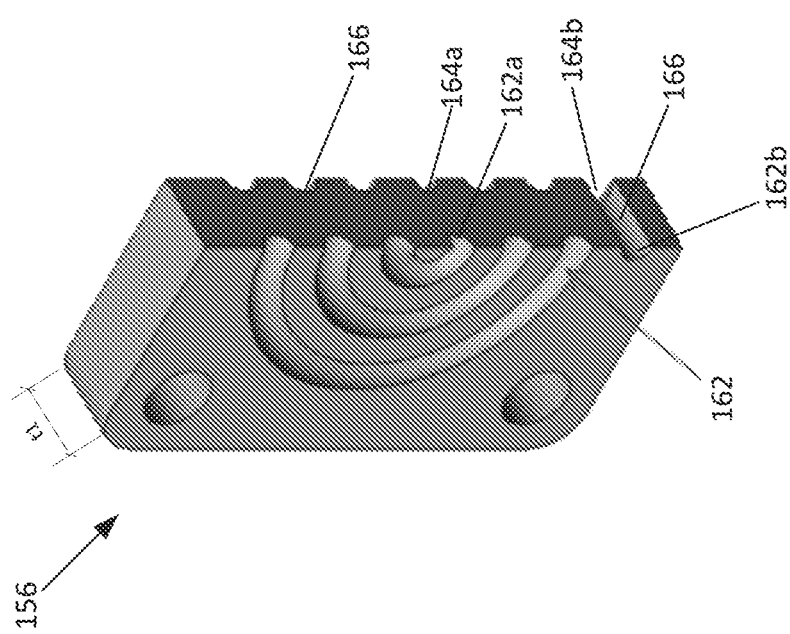
FIG. 8 is a perspective cross-sectional view of the metering plate shown in FIG. 7.
Figure 7:
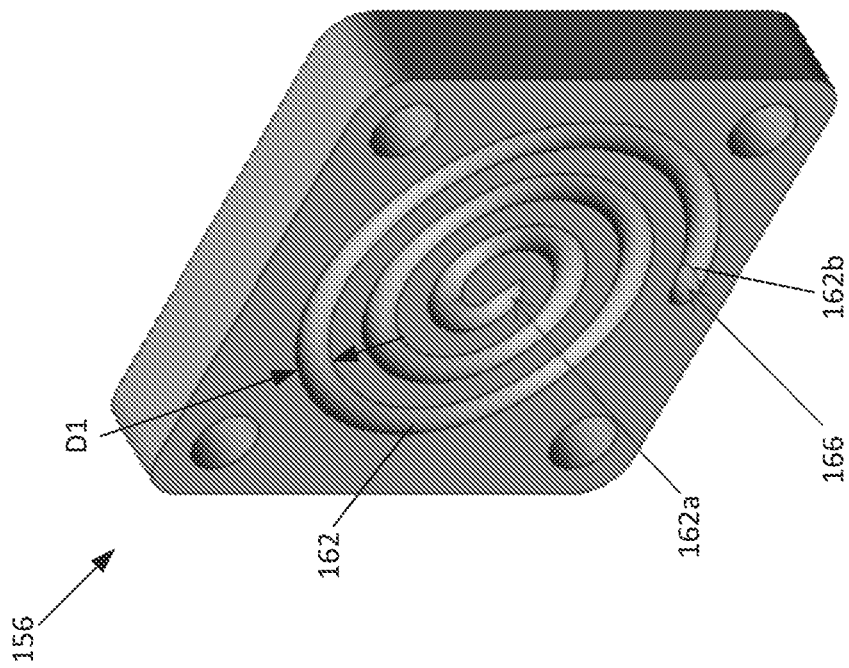
FIG. 7 is a perspective view of an individual metering plate of the metering tube assembly shown in FIG. 4.

In the example shown, the metering tube assembly 150 in FIGS. 4 and 5 measures approximately 1½"×1½"×1½" with each of the inlet, outlet, and metering plates 152, 154, 156 having a height of 1½" and a width of 1½". In the example shown, the inlet and outlet ports 152a, 154a are have a nominal diameter of ¼" and are configured with a push-to-connect type fitting. Other types of fittings are possible, such as threaded fittings and other quick-connect type fittings. In one aspect, the metering tube assembly 150 is bidirectional in that the desired pressure drop through the metering tube assembly 150 is the same whether fluid flows form the inlet to the outlet or from the outlet to the inlet.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

I claim:
1. A metering tube assembly for regulating flow of a fluid, the metering tube assembly comprising:
  a fluid inlet;
  a fluid outlet;
  a plurality of stacked metering plates located between the fluid inlet and the fluid outlet, each of the plurality of stacked metering plates defining a fluid passageway in fluid communication with the fluid inlet and fluid outlet, and having a length greater than a thickness of the metering plate, wherein the stacked metering plates are arranged such that a fluid flowing through the metering plates flows sequentially through the fluid passageways of the metering plates;
  an inlet plate including a main body and an integral inlet port extending in a first axial direction from the main body, the inlet port defining the fluid inlet; and
  an outlet plate including a main body and an integral outlet port extending in a second axial direction, opposite the first axial direction, from the main body, the outlet port defining the fluid outlet;
  a plurality of gaskets disposed between the plurality of stacked metering plates, each of the plurality of gaskets having a central aperture placing ends of the fluid passageways of adjacent metering plates in fluid communication with each other while separating lengths of the fluid passageways of adjacent metering plates;
  wherein the plurality of stacked metering plates, the plurality of gaskets, the inlet plate, and the outlet plate are stacked together to form an assembly with an outer perimeter defined by the plurality of stacked metering plates, the plurality of gaskets, the inlet plate, and the outlet plate, the outer perimeter having a dimension of about 1.5 inches;
  wherein the plurality of stacked metering plates, the inlet plate, and the outlet plate include a plurality of coaxially aligned apertures through which fasteners extend to rigidly secure the plurality of stacked metering plates, the inlet plate, and the outlet plate together.
2. The metering tube assembly of claim 1, wherein the fluid passageway of each metering plate is formed as an open channel in the metering plate.

3. The metering tube assembly of claim 2, wherein each metering plate defines a first side and a second side, and wherein a first segment of the fluid passageway is defined on the first side and a second segment is defined on the second side.

4. The metering tube assembly of claim 3, wherein the fluid passageway includes a third segment extending through the thickness of the metering plate to join the first and second segments of the fluid passageway.

5. The metering tube assembly of claim 1, wherein at least a portion of the fluid passageway length is non-linear.

6. The metering tube assembly of claim 5, wherein at least a portion of the fluid passageway forms a spiral shape.

7. The metering tube assembly of claim 1, wherein each of the plurality of stacked metering plates is identical to the others of the plurality of stacked metering plates.

8. The metering tube assembly of claim 1, wherein the plurality of stacked metering plates includes at least three metering plates.

9. The metering tube assembly of claim 1, wherein the fluid passageway extends between a first end and a second end, wherein the first and second ends are coaxially aligned about a longitudinal axis of the plurality of stacked metering plates.

10. The metering tube assembly of claim 9, wherein the longitudinal axis extends through a center of each metering plate.

11. The metering tube assembly of claim 9, wherein the fluid inlet and the fluid outlet are coaxially aligned about the longitudinal axis.

* * * * *